United States Patent [19]

Heikkila et al.

[11] Patent Number: 5,084,104
[45] Date of Patent: Jan. 28, 1992

[54] METHOD FOR RECOVERING XYLOSE

[75] Inventors: Heikki Heikkila, Espoo; Goran Hyoky, Kantvik, both of Finland

[73] Assignee: Cultor, Ltd., Finland

[21] Appl. No.: 446,203

[22] Filed: Dec. 5, 1989

[51] Int. Cl.$^5$ .................... C13K 01/02; C13J 01/06; B01D 15/00; B01D 15/04
[52] U.S. Cl. ..................... 127/46.2; 127/46.3; 127/37; 210/663; 210/673; 210/690; 210/691
[58] Field of Search ............ 127/46.2, 46.3, 37; 210/673, 663, 690, 691

[56] References Cited

U.S. PATENT DOCUMENTS

| | | | |
|---|---|---|---|
| 2,890,972 | 6/1959 | Wheaton | 127/46 |
| 2,937,959 | 5/1960 | Reents et al. | 127/46 |
| 3,558,725 | 1/1971 | Kohno et al. | |
| 4,008,285 | 2/1977 | Melaja et al. | 127/46.2 |
| 4,066,711 | 1/1978 | Melaja et al. | 260/637 R |
| 4,075,406 | 6/1978 | Melaja et al. | |

OTHER PUBLICATIONS

Chromatographic Reviews, vol. 98, No. 1, Elsevier Scientific Publishing Company, Amsterdam, Mar. 27, 1974, pp. 80–81.

Y. Takasaki (Agr. Biol. Chem. 36 (1972), pp. 2575–2577).

B. Lindberg et al., (Carbohyd. Res. 5 (1967), pp. 286–291).

Samuelson et al., (Acta Chem. Scand. 22 (1968), pp. 1252–1258).

Primary Examiner—Theodore Morris
Assistant Examiner—P. L. Hailey
Attorney, Agent, or Firm—Kenyon & Kenyon

[57] ABSTRACT

A process for recovering xylose from pentosan-containing raw materials includes the steps of hydrolyzing the raw material, feeding the hydrolyzed material to a chromatographic column comprising a strong anion-exchanger having a quaternary ammonium functional group fixed to a cross-linked polystyrene or acrylic resin matrix and eluting a xylose-rich fraction.

18 Claims, 5 Drawing Sheets

METHOD FOR RECOVERING XYLOSE

FIELD OF THE INVENTION

The present invention relates to a method for recovering D-xylose from plant material hydrolystates and other pentosan-containing materials.

BACKGROUND OF THE INVENTION

D-xylose can be recovered from a variety of materials after hydrolysis of xylans to xylose. There are many prior art processes which claim to provide acceptable means for obtaining xylose from natural materials, such as birch wood, corn cobs and cotton seed hulls, among others.

One method of recovery of xylose from the aforementioned materials is by chromatographic separations, such as that discussed in U.S. Pat. No. 4,075,406. Therein, the raw material is hydrolyzed and then purified by ion exchange and color removal. The ion exchange is accomplished by passing the solution through successive beds of strong cation exchanger and weak anion exchanger. The purified solution is then subjected to chromatographic fractionation to provide a solution containing xylose. The resin employed in the chromatographic separation is a strongly acid cation exchanger, sulfonated polystyrene cross-coupled with 3.5% divinyl benzene, the resin being in calcium form.

Anion exchange resins have been used in the past for separating fructose from glucose. Y. Takasaki (Agr. Biol. Chem. 36 (1972) pages 2575-77) and B. Lindberg et al. (Carbohyd. Res. 5 (1967), pages 286-291) describe the use of an anion exchanger in bisulfite form for the separation of sugars.

The use of anion exchange resins has been found to be disadvantageous, however, because xylose is eluted between other sugars and not separated last. This results in a poor xylose separation.

Anion exchange resins in the sulfate form have been tested by Samuelson et al. (Acta Chem. Scand. 22 (1968), pages 1252-58). In these tests, ethanol was used as the eluent Solution rather than water. The resultant xylose separation was said to be unsatisfactory, and cation exchange resins were recommended instead for sugar separation.

The separation of xylose by cation exchangers has been practiced industrially but is complicated. This method of separation requires two steps. In the first step, ionized substances and high molecular weight substances are separated from low molecular weight substances by ion-exclusion. In a second step, a xylose-rich solution is recovered after chromatographic separation of the sugars. In both separation steps, a cation exchange resin is used. In the ion-exclusion step, the resin is preferably in alkali-metal form (e.g., sodium or potassium). In the second step, the resin is in alkaline earth form (e.g., calcium or strontium). The separation of xylose by this method has also been found to be unsatisfactory.

It is therefore an object of the present invention to provide a method for obtaining an excellent separation of a xylose-containing solution from a raw material.

It is another object of the present invention to provide a method for the recovery of xylose from a xylose-containing solution which is uncomplicated and which can be practiced commercially.

It is another object of the present invention to provide a method for the recovery of xylose from a xylose-containing solution which requires a single separation step.

It is still another object of this invention to separate xylose from all the other monosaccharides by single step.

SUMMARY OF THE INVENTION

The above-mentioned objects and others are accomplished by the present invention which provides a method for the recovery of xylose from a xylose-containing solution, comprising the steps of preparing a pentose-rich acid hemicellulose hydrolysate, feeding said hydrolysate into a chromatographic column having a strong anion-exchange resin in sulfate form. The column is then eluted with a suitable eluent solution comprising water. A xylose-rich product fraction is recovered after fractions containing impurities and all other sugars have been eluted.

Preferably, the ion-exchange resin used in the present invention is a polystyrene-based ion-exchanger with a quaternary ammonium functional group cross-linked with from about 3 to about 5 percent divinyl benzene in sulfate form.

Three fractions are obtained in preferred embodiments. The first fraction is a mixed by-product or waste fraction The second fraction is low-xylose containing fraction The third fraction is a xylose-rich product fraction.

In a preferred embodiment, the present invention further comprises recirculating the low xylose-containing fraction through said column, or by combining it with next feed.

In another preferred embodiment, the present invention further comprises neutralizing pentose-rich hemicellulose hydrolysate to a pH from about 5 to about 7 prior to its introduction to said column.

D-xylose may be recovered from the xylose-rich fraction by any method known in the art. It is preferably recovered by evaporating the xylose-rich fraction at a temperature from about 40 to about 80° C. to a solids content from about 70 to about 80 weight percent of said xylose-rich fraction on a dry solids basis, and then crystallizing the xylose-rich fraction by cooling crystallization.

The raw materials from which xylose is to be recovered are preferably lignocellulose materials including wood of various species of trees, such as birch and beach. Also useful are oat hulls, corn cobs and stalks, coconut shells, almond shells, straw, bagasse and cotton seed hulls. Where wood is used, it is preferably subdivided into wood chips, shavings saw dust and the like. In addition, xylan-rich prehydrolysates from wood-chemical industries can be used. These are waste by-products and contain the main part of wood hemicellulose.

BRIEF DESCRIPTION OF THE DRAWINGS

The following drawings are illustrative of embodiments of the invention and are not meant to limit the scope of the invention, as encompassed by the claims.

DETAILED DESCRIPTION

Figure 1:
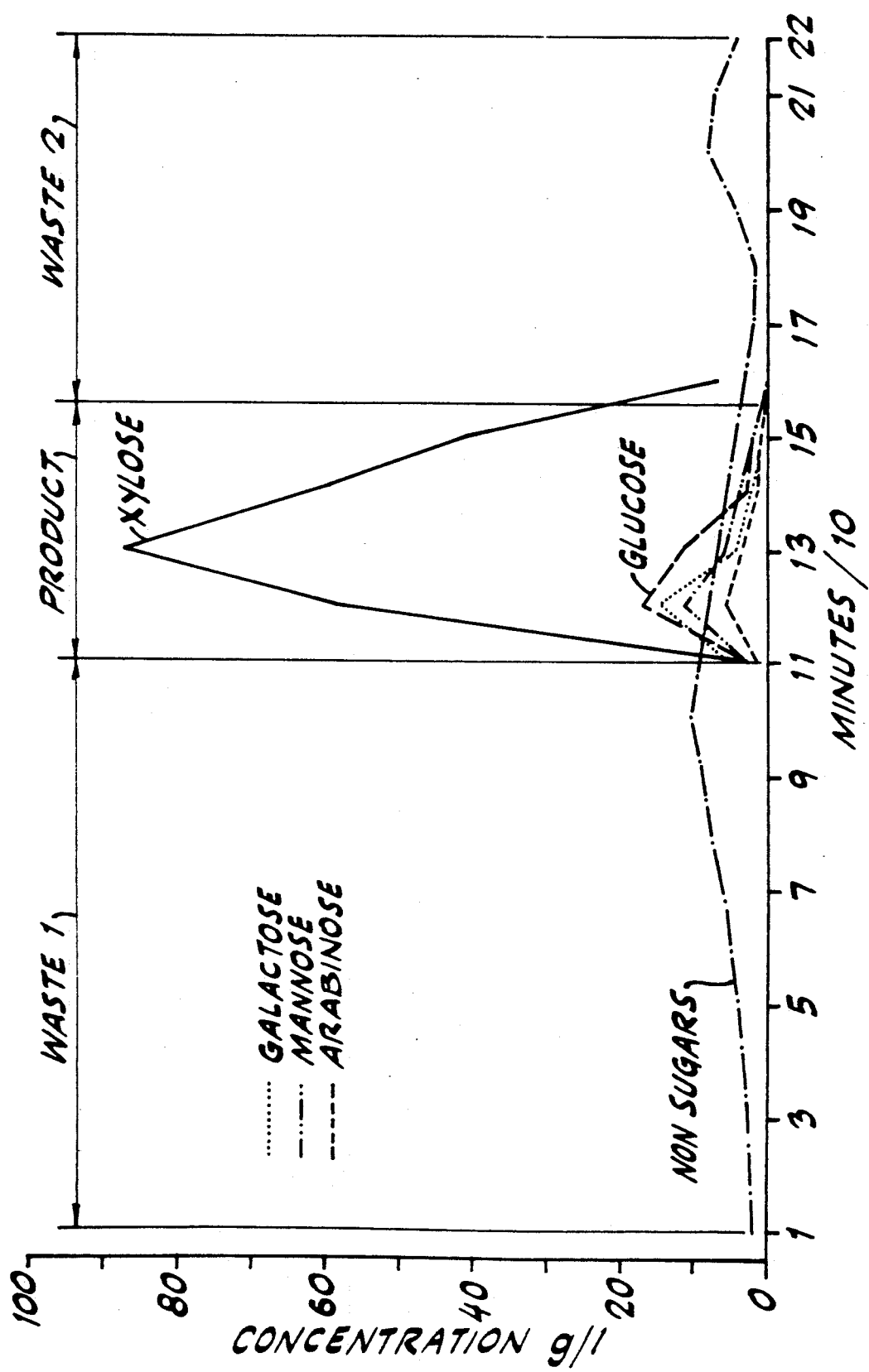
FIG. 1 is a graphical presentation of the elution profiles obtained from Example 1.

These raw materials are hydrolyzed by any procedure well known in the art. Suitable procedures described in the literature include those given in U.S. Pat. Nos. 2,734,836; 2,759,856; 2,801,939; 2,974,067 and 3,212,932. The method of hydrolysis is preferably chosen such that a maximum yield of pentoses be obtained. Preferably, the raw materials are subjected to an acid hydrolysis.

The hydrolyzed pentose-rich solution preferably is acidic, with a pH from about 1.5 to about 3.5. The pentose-rich solution may or may not be neutralized prior to the separation step. If the pentose-rich solution is neutralized, it is preferable that the neutralization be accomplished with a material which does not cause serious deterioration of the sugars, such as sodium hydroxide.

The pentose-rich solution is then subjected to the separation step. The separation step of the present invention combines ion exclusion and chromatographic fractionation techniques on a column filled with a suitable ion-exchange resin.

The ion-exchange resin used in the present invention is an anion-exchange resin in the sulfate ($SO_4$) form. Preferably, the chromatographic column comprises a strong base anion exchanger, having quaternary ammonium functional groups cross-linked with from about 3 to about 5 divinyl benzene.

The separation step is carried out at a temperature from about 10 to about 80° C., preferably from about 35 to about 65° C. In practice the preferred eluent solution is comprises water. Most preferably, the eluent solution is pure water. In contrast, eluent solutions such as ethanol and sodium sulfate have been used in the prior art.

Preferably, the ion-exchange resin used in the present invention is an isoporous type 1 or type 2 strong base ion exchange resin with a polystyrene/divinylbenzene matrix. An example of a preferred type 1 anion exchange resin is commercially available under the tradename Zerolit FF(ip). An example of a preferred type 2 anion exchange resin is commercially available under the tradename Zerolit N (ip). Most preferably, the ion-exchange resin is a strong base with acrylic matrix and quaternary ammonium groups as functional groups (Amberlite IRA 458). This kind of resin is not as susceptible to fouling as polystyrene/divinylbenzene resins. The principle applications of such ion exchange resins have previously been concerned with the treatment of sugar solutions for the removal of colored organic compounds and ash.

In the present invention, xylose is sorpted most strongly Other monosaccharides are less strongly sorpted. Oligo-saccharides are the least sorpted sugars by the present ion exchange resin used in the present invention.

The order of elution in the present invention is different than the order obtained using resins in the bisulfite form. Rather than being eluted as a middle fraction (as in the case of bisulfite resins), the xylose-rich fraction is obtained in the present invention after impurities and other sugars have been eluted. This allows the xylose to be recovered with good yield as a highly purified fraction.

DETAILED DESCRIPTION OF THE PREFERRED EMBODIMENTS

The following examples illustrate the present invention. They are not to be construed to limit the claims in any manner whatsoever.

EXAMPLE 1

A xylose-rich birch wood hemicellulose hydrolysate is obtained by acid hydrolysis with sulfuric acid. The hydrolysate has a pH of about 1.4 and 25.2 g dry substance/100 ml. The composition of the hydrolysate is set forth in Table 1.

TABLE 1

| Composition of Hydrolysate | |
|---|---|
| Ingredient | Percentage (dry solids basis) |
| Xylose | 55.4 |
| Arabinose | 2.8 |
| Galactose | 6.0 |
| Glucose | 7.8 |
| Mannose | 5.5 |
| Other sugars | 5.6 |
| Other substances | 17.1 |

The hydrolysate solution is uniformly fed across the top of a chromatographic column at a flow rate of 3.0 ml/minute and a temperature of about 55° C. until a total of 100 ml are fed to the column. The column comprises Zerolit FF IP (a strong base ion exchange resin having quarternary ammonium groups) crosslinked with 3–5% divinyl benzene in sulphate form. The bed height of the column is 77 cm and the diameter is 4.4 cm. The mean resin particle size is about 0.1 mm.

The column is then eluted with water. The first fraction recovered is a mixed by-product fraction, which is collected and separated from the system. The second fraction recovered is a xylose-rich fraction. A third fraction recovered is another waste fraction which mainly comprises non-sugar substances. The composition of the three fractions is provided in Table 2. The elution profiles are illustrated in FIG. 1.

TABLE 2

| Percent Composition of Eluted Fractions (Dry Solids Basis) | | | |
|---|---|---|---|
| Ingredient | Waste (Fraction 1) | Product (Fraction 2) | Waste (Fraction 3) |
| *Cut Point [min] | 120 | 155 | |
| Xylose | 31.8 | 79.6 | 10.8 |
| Arabinose | 3.6 | 2.5 | 0.1 |
| Galactose | 10.3 | 3.3 | 0.1 |
| Glucose | 10.1 | 6.9 | 0.4 |
| Mannose | 7.2 | 4.8 | 0.4 |
| Other sugars | 9.5 | 3.0 | 0.6 |
| Other substances | 27.4 | — | 87.6 |

*Time after beginning of first collected fraction.

The product fraction is recovered between 120 minutes and 155 minutes after beginning to recover the first collected fraction The total time used for collections of all fractions was about 200 minutes.

EXAMPLE 2

A xylose-rich birch wood hemicellulose hydrolysate is obtained by acid hydrolysis with sulfuric acid. The hydrolysate is neutralized with sodium hydroxide to a pH of about 5.5. The composition of the hydrolysate feed solution is set forth in Table 3.

TABLE 3

| Composition of Hydrolysate | |
|---|---|
| Ingredient | Percentage (Dry Solids Basis) |
| Xylose | 54.4 |
| Arabinose | 2.3 |
| Galactose | 5.0 |
| Glucose | 4.7 |
| Mannose | 5.2 |
| Other sugars | 3.1 |
| Other substances | 25.4 |

The resultant hydrolysate feed solution, which has a 23.3 g/100 ml concentration, is then fed across the top of a chromatographic column similar to that set forth in Example 1 at a temperature of about 55° C. and a flow rate of 3.0 ml/minute until a total of 100 ml of feed solution are fed to the column.

Figure 2:
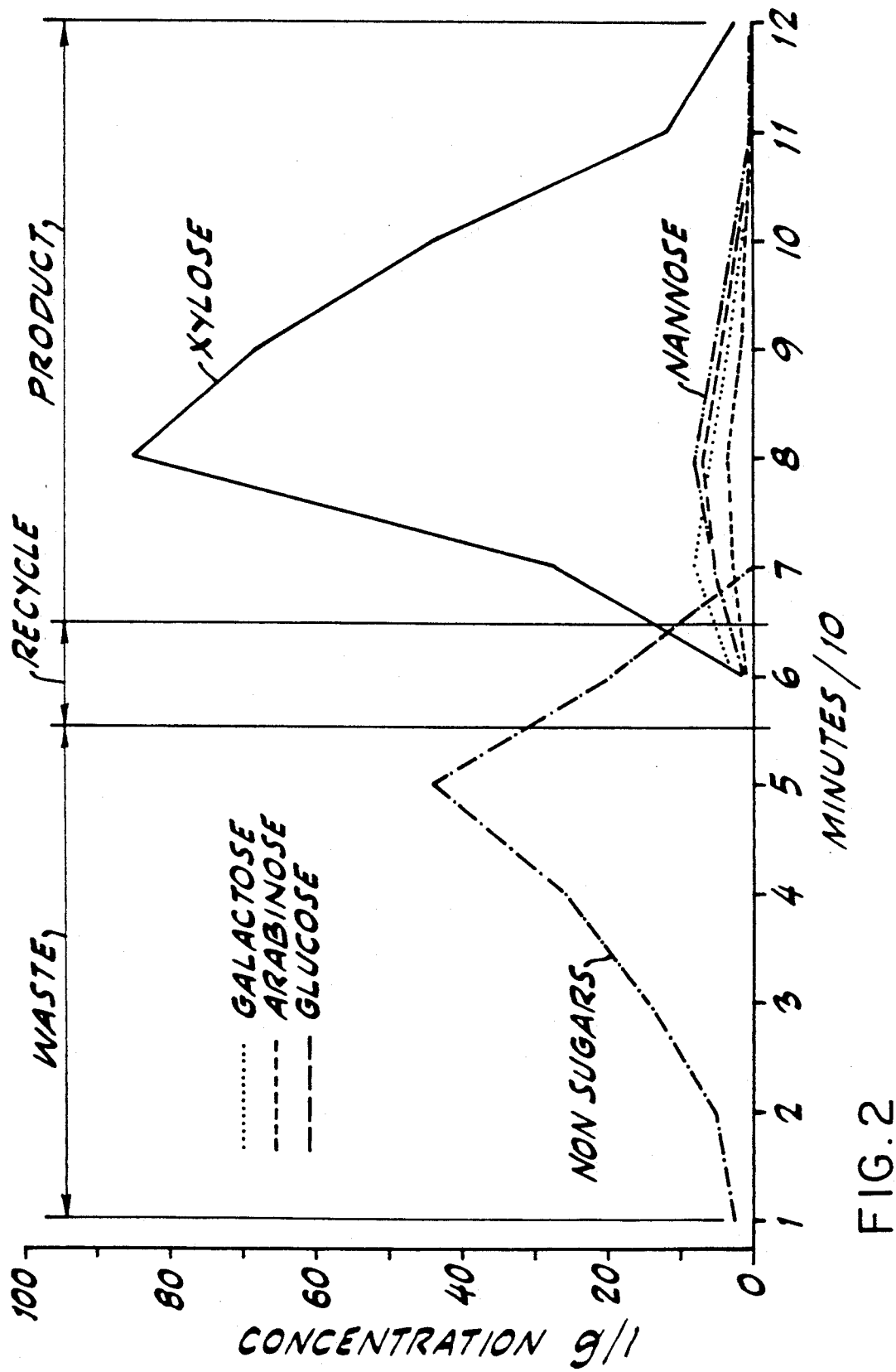
FIG. 2 is a graphical presentation of the elution profiles obtained of Example 2.

The column is then eluted with water. The first fraction eluted is a mixed by-product or waste fraction, which is collected and separated from the system. The first fraction covers the first 85 minutes of separation of the column. The second fraction is recovered during the next 5 minutes of separation of the column. The second fraction is collected and separated from the system, and then recycled to an earlier point in the system, i.e. combined with feed liquor to the next separation. The third fraction is recovered during the next 78 minutes of separation. The composition of the three recovered fractions is provided in Table 4. The elution profiles are illustrated in FIG. 2.

TABLE 4

| Percent Composition of Eluted Fractions (Dry Solids Basis) | | | |
|---|---|---|---|
| Ingredient | Waste (Fraction 1) | Recirculation (Fraction 2) | Product (Fraction 3) |
| *cut point [min] | 85 | 90 | |
| Xylose | 2.7 | 55.6 | 75.4 |
| Arabinose | 0.8 | 5.6 | 2.7 |
| Galactose | 2.7 | 16.7 | 5.2 |
| Glucose | 1.4 | 11.1 | 5.7 |
| Mannose | 1.4 | 11.1 | 6.5 |
| Other sugars | — | — | 4.6 |
| Other substances | 91.1 | — | — |

*Time after beginning of first collected fraction.

Crystalline D-xylose can be crystallized from the product fraction.

EXAMPLE 3

A xylose-rich birch mother liquor from xylose crystallization is used as feed solution. The composition of the hydrolysate is set forth in Table 5.

TABLE 5

| Composition of Feed Solution | |
|---|---|
| Ingredient | Percentage (Dry Solids Basis) |
| Xylose | 60.5 |
| Arabinose | 8.3 |
| Galactose | 10.0 |
| Glucose | 9.4 |
| Mannose | 10.2 |
| Rhamnose | 1.4 |
| Others | 0.2 |

The feed solution is then fed across the top of a chromatographic column similar to that set forth in Example 1 except having a bed height of 83 cm at a temperature of about 55° C. and a flow rate of 3.7 ml/minute until a total of 51.5 ml of feed solution is fed to the column.

Figure 3:
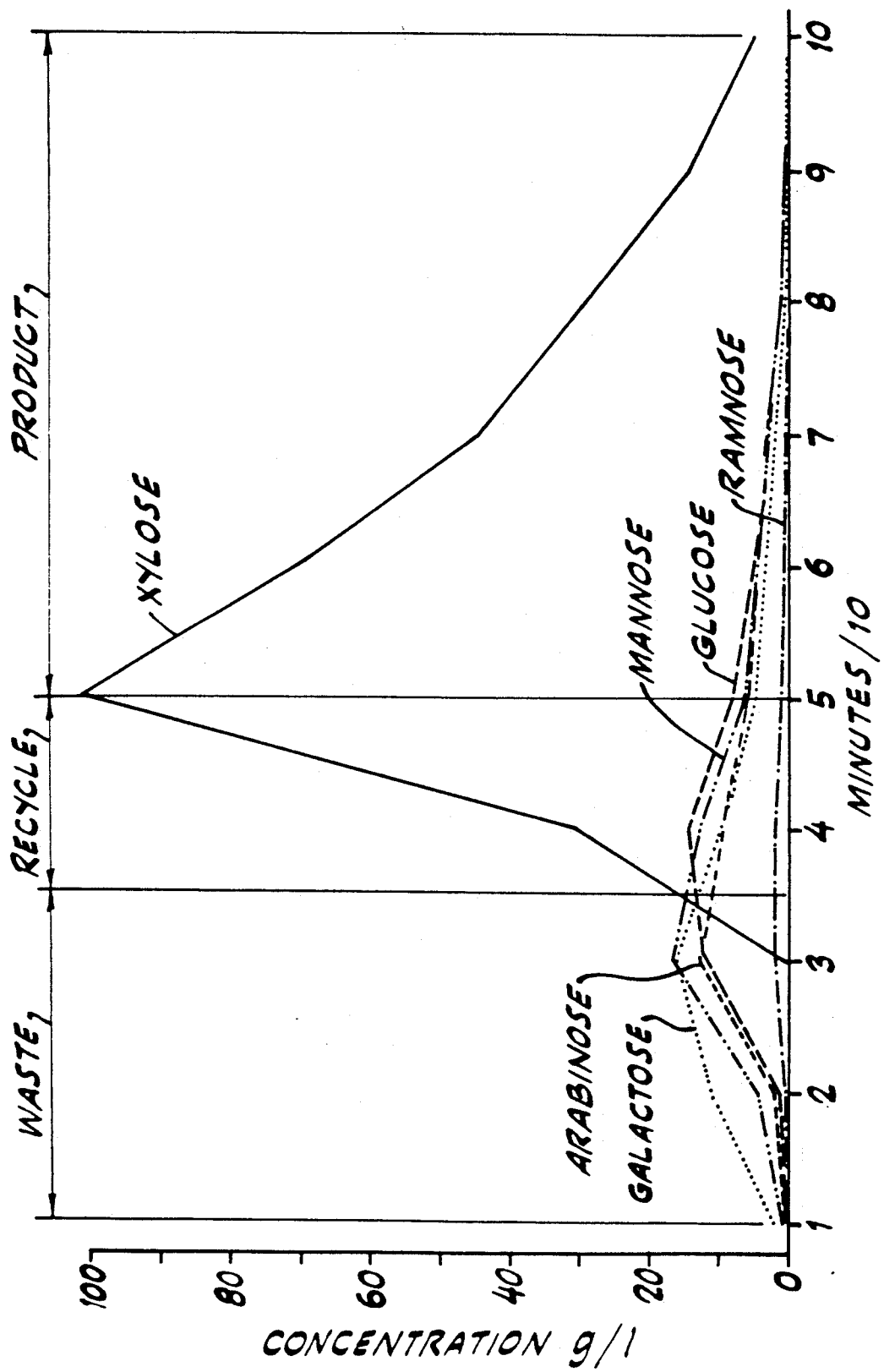
FIG. 3 is a graphical presentation of the elution profiles obtained of Example 3.

The column is then eluted with water. The first fraction eluted is a mixed waste fraction which is collected and separated from the system. The first fraction covers the first 35 minutes of separation of the column. The second fraction is collected and separated from the system during the next 15 minutes and then recycled and combined with the next feed. The third fraction is recovered during the next 55 minutes of separation of the column. The compositions of the three fractions are provided in Table 6. The elution profiles are illustrated in FIG. 3.

TABLE 6

| Percent Composition of Eluted Fractions (Dry Solids Basis) | | | |
|---|---|---|---|
| Ingredient | Waste (Fraction 1) | Recirculation (Fraction 2) | Product (Fraction 3) |
| *Cut Point [min] | 35 | 45 | |
| Xylose | 12.9 | 64.0 | 81.5 |
| Arabinose | 16.3 | 7.6 | 4.8 |
| Galactose | 27.6 | 6.8 | 3.0 |
| Glucose | 16.8 | 10.8 | 5.3 |
| Mannose | 22.9 | 9.2 | 4.6 |
| Rhamnose | 2.8 | 1.5 | 0.7 |
| Other substances | 0.6 | 0.1 | 0.1 |

*Time after beginning of first collection fraction.

D-xylose can be crystallized from this product fraction with good yield.

EXAMPLE 4

A synthetic feed solution is prepared having a composition provided in Table 7. The feed solution had a dry substance concentration of 30 g//100 g.

TABLE 7

| Composition of Feed Solution | |
|---|---|
| Ingredient | Percentage (Dry Solids Basis) |
| Sodium sulphate | 20 |
| Arabinose | 8 |
| Glucose | 12 |
| Xylose | 60 |

The feed solution is uniformly feed across the top of a chromatographic column at a flow rate of 1.9 ml/minute and a temperature of about 55° C. until a total of 75 ml are fed to the column. The column comprises a strong base ion exchanger of type II Purolite A300. The bed height of the column is 146 cm and the diameter is 2.54 cm. The mean resin particle size is about 0.2 mm.

Figure 4:
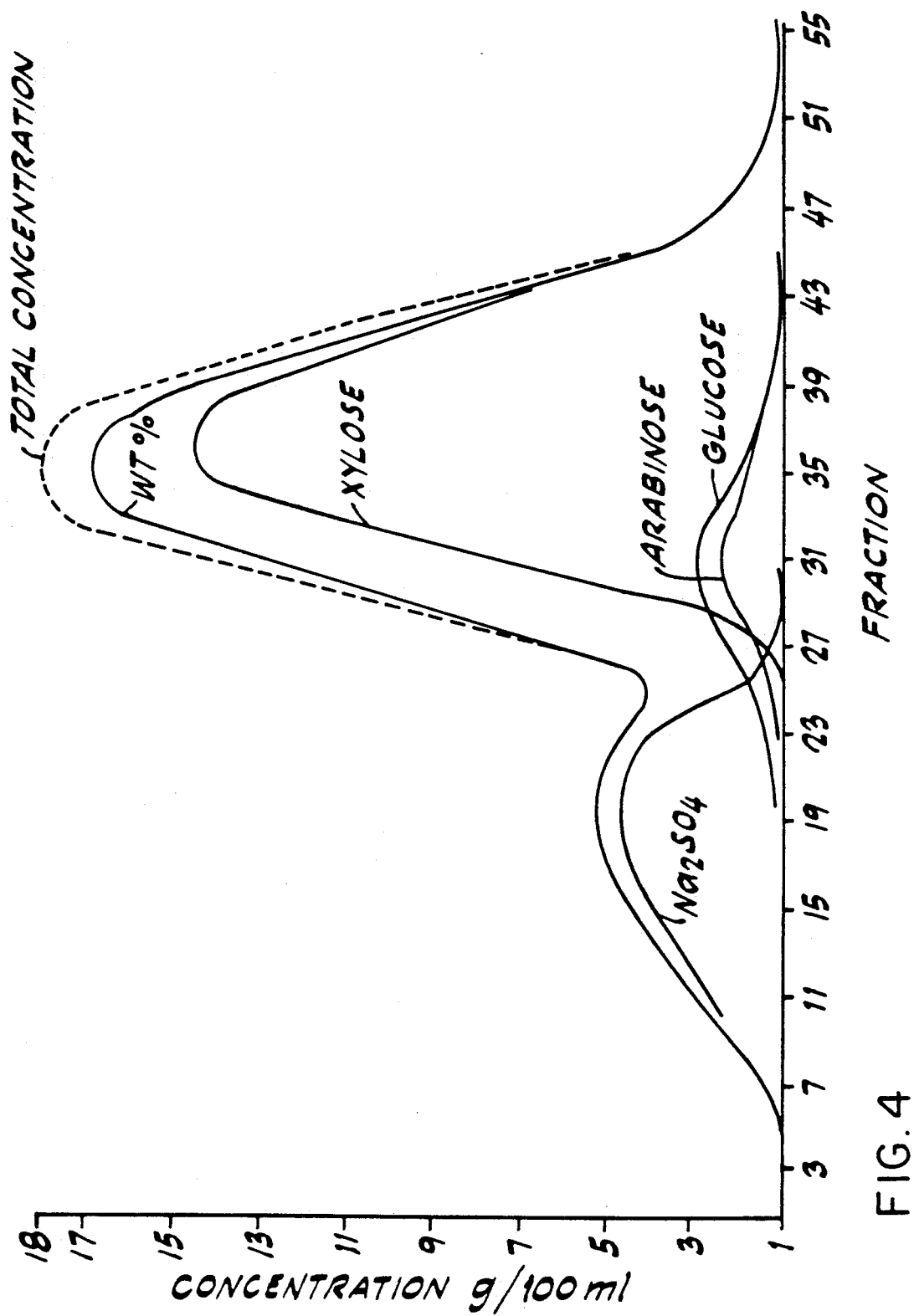
FIG. 4 is a graphical presentation of the elution profiles obtained of Example 4.

The column is then eluted with water, and portions of about 5.7 ml are eluted from the bottom of the column. The first fraction, comprising portions 3–25, is the salt fraction, regarded as waste. The second fraction, comprising portions 26–34, is mainly a mixture of sugars, which are collected and separated. The second fraction can be combined with the next feed solution. The third fraction, comprising portions 35–55, is a xylose rich product from which D-xylose can be crystallized. The elution profiles are illustrated in FIG. 4.

EXAMPLE 5

A synthetic feed solution is prepared having a composition provided in Table 8. The feed solution had a dry substance concentration of 27 g/100 ml.

TABLE 8

| Composition of Feed Solution | |
|---|---|
| Ingredient | Concentration (g/100 ml) |
| Sodium sulphate | 5 |
| Xylose | 15 |
| Arabinose | 3 |

TABLE 8-continued

| Composition of Feed Solution | |
|---|---|
| Ingredient | Concentration (g/100 ml) |
| Glucose | 2 |
| Mannose | 2 |

The feed solution is uniformly feed across the top of a chromatographic column at a flow rate of 1.25 ml/min and a temperature of about 55° C. until a total of 50 ml is fed to the column. The column comprises a strong base anion exchanger with acrylic matrix of type Amberlite IRA 458 in sulphate form. The bed height of the column is 112 cm and the diameter is 2.54 cm. The means resin particle size is 0.24 mm.

Figure 5:
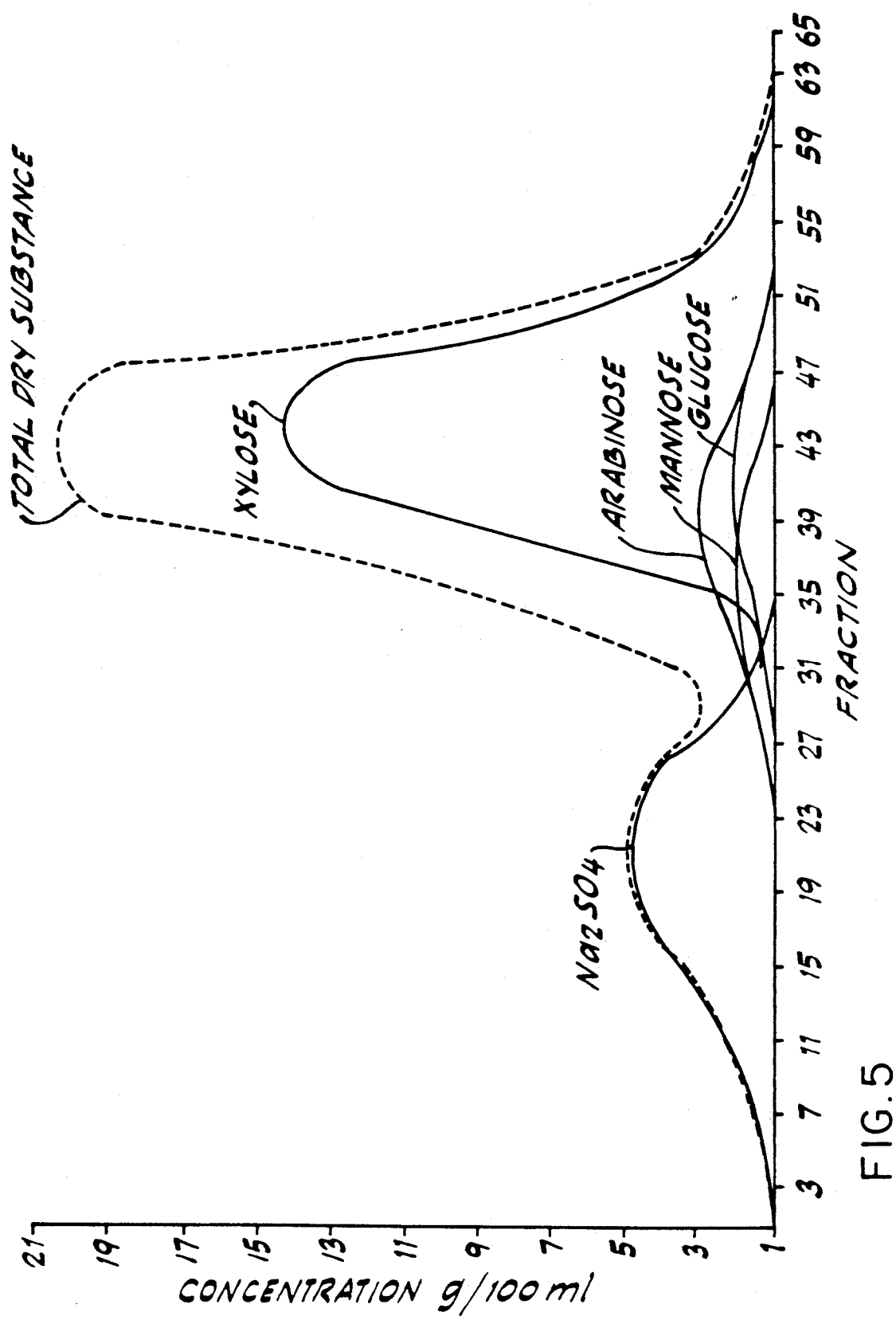
FIG. 5 is a graphical presentation of the elution profiles obtained of Example 5.

The column is the eluted with water. Fractions were collected at 3 minutes intervals and analyzed for their dry substance, sodium sulphate and sugar content. Sodium sulphate elutes in fractions 1-35, and a mixture of sodium sulphate and sugars are eluted in fractions 25-35. The xylose fraction can be recovered from fractions 40-65. The fraction comprising portions 35-40 can also be collected and recycled to the separation. The elution profiles are illustrated in FIG. 5.

The examples provided are not meant to be exclusive. Many other variations of the present invention would be obvious to those skilled in the art, and are contemplated to be within the scope of the appended claims.

We claim:

1. A process for the production of a high purity xylose fraction from a xylose-rich solution containing other monosaccharides and impurities which does not require a separate ion exclusion step, comprising the steps of
   1) feeding a xylose-rich solution into a chromatographic column having a strong anion exchange resin in sulfate form;
   2) eluting the column with an eluent solution comprising water;
   3) collecting and separating a first fraction comprising a mixed by-product from the column; and thereafter
   4) collecting and separating a xylose-rich fraction of high purity.

2. The process of claim 1, wherein the anion exchanger resin is a polystryene-based ion-exchanger with quaternary ammonium functional groups cross-linked with from about 3 to about 5 percent sulfonated divinyl benzene.

3. The process of claim 1, wherein the anion exchanger resin has an acrylic matrix and quaternary ammonium functional groups.

4. The process of claim 2, further comprising collecting and separating a third fraction comprising a mixed by-product after said xylose-rich fraction is separated.

5. The process of claim 4, further comprising collecting and separating a low xylose fraction between said mixed by-product and said xylose fraction.

6. The process of claim 2, further comprising neutralizing said xylose-rich solution to a pH from about 5 to about 7 prior to its introduction to said column.

7. The process of claim 5, further comprising recirculating said xylose-rich fraction through said column, and eluting a low xylose content fraction as a third fraction having a higher yield of xylose than said recirculate fraction.

8. The process of claim 5, further comprising recirculating said low xylose fraction and combining it to next feed solution.

9. The process of claim 6 further comprising recovering D-xylose from said xylose-rich fraction by evaporating said xylose-rich fraction at a temperature from about 40 to about 80° C. to a solids content of from about 70 to about 80 weight percent of said xylose-rich fraction on a dry solids basis, and then crystallizing said xylose-rich fraction by cooling crystallization.

10. A process for the production of high purity xylose fraction from a xylose-rich solution containing monosaccharides and impurities which does not require a separate ion exclusion step, comprising the steps of
    1) feeding a xylose-rich solution into a chromatographic column having a polystyrene-based ion-exchanger having a quaternary ammonium functional group cross-linked with from about 3 to about 5 percent sulfonated divinyl benzene or an acrylic matrix with quaternary ammonium groups at a flow rate from about 0.04 to about 1.5 m$^3$/m$^2$/h and at a temperature from about 35 to about 65° C.;
    2) eluting the column with an eluent solution comprising water;
    3) collecting and separating a first fraction comprising a mixed by-product fraction from the column; and thereafter
    4) collecting and separating a second fraction comprising a xylose-rich fraction of high purity.

11. The process of claim 10, further comprising collecting and separating a third fraction comprising a mixed by-product after said xylose-rich fraction is separated.

12. The process of claim 11, further comprising recirculating said low xylose containing fraction through said column, and eluting a xylose-rich fraction as a third fraction having a higher yield of than said recirculated fraction.

13. The process of claim 10, further comprising collecting and separating a low xylose fraction between said mixed by-product and said xylose fraction.

14. The process of claim 13, further comprising recirculating said low xylose fraction and combining it to next feed solution.

15. The process of claim 10, further comprising neutralizing xylose-rich solution to a pH from about 5 to about 7 prior to its introduction to said column.

16. The process of claim 10, further comprising recovering D-xylose from said xylose-rich fraction by evaporating said xylose-rich fraction at a temperature from about 40° to about 80° C. to a solids content of from about 70 to about 80 percent of said xylose-rich fraction on a dry solids basis, and then crystallizing said xylose-rich fraction by cooling crystallization.

17. The process of claim 10, wherein the said xylose containing solution is obtained by acid hydrolysis of pentosan-containing material.

18. The process of claim 10, wherein said xylose containing solution is the mother liquid obtained from xylose crystallization.

* * * * *

UNITED STATES PATENT AND TRADEMARK OFFICE
CERTIFICATE OF CORRECTION

PATENT NO. : 5,084,104

DATED : January 28, 1992

INVENTOR(S) : Heikki Heikkila et al.

It is certified that error appears in the above-identified patent and that said Letters Patent is hereby corrected as shown below:

Column 7, line 49-50, "sulfonated divinyl benzene" should be changed to - -divinyl benzene in sulfate form- -;

Column 8, line 21, "sulfonated" should be deleted and - -in sulfate form- - should be inserted at lines 18-19 after "ion-exchanger".

Signed and Sealed this

Tenth Day of April, 2001

*Attest:*

NICHOLAS P. GODICI

*Attesting Officer*   Acting Director of the United States Patent and Trademark Office